United States Patent
Lin et al.

(10) Patent No.: US 9,371,233 B2
(45) Date of Patent: Jun. 21, 2016

(54) POLYAMIDE-IMIDES, GRAPHITE FILMS AND PREPARATION FOR THE GRAPHITE FILM

(71) Applicant: INDUSTRIAL TECHNOLOGY RESEARCH INSTITUTE, Hsinchu (TW)

(72) Inventors: Chen-Lung Lin, Hsinchu (TW); Yen-Chun Liu, Taipei (TW); Hui-Wen Chang, Hsinchu (TW); Kuo-Chan Chiou, Tainan (TW); Hsien-Lin Hu, Zhudong Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/484,430

(22) Filed: Sep. 12, 2014

(65) Prior Publication Data
US 2015/0166347 A1 Jun. 18, 2015

(30) Foreign Application Priority Data
Dec. 17, 2013 (TW) .............................. 102146537 A

(51) Int. Cl.
*C01B 31/04* (2006.01)
*C08G 73/14* (2006.01)
*C09D 179/08* (2006.01)
*C08G 73/10* (2006.01)

(52) U.S. Cl.
CPC ............ *C01B 31/04* (2013.01); *C08G 73/1035* (2013.01); *C08G 73/1042* (2013.01); *C08G 73/1053* (2013.01); *C08G 73/1067* (2013.01); *C08G 73/1071* (2013.01); *C08G 73/14* (2013.01); *C09D 179/08* (2013.01)

(58) Field of Classification Search
CPC .......... C01B 31/04; C08G 73/14; C09K 5/14; C10B 57/02
See application file for complete search history.

(56) References Cited

U.S. PATENT DOCUMENTS

| 4,876,077 | A | 10/1989 | Murakami |
| 4,915,984 | A | 4/1990 | Murakami |
| 4,954,611 | A | 9/1990 | Chen, Sr. et al. |
| 5,091,025 | A | 2/1992 | Murakami et al. |
| 5,761,256 | A | 6/1998 | Inoue et al. |
| 5,955,568 | A | 9/1999 | Choi et al. |
| 7,736,542 | B2 | 6/2010 | Shibata et al. |
| 7,758,842 | B2 | 7/2010 | Nishikawa et al. |
| 8,105,565 | B2 | 1/2012 | Nishikawa et al. |
| 8,337,800 | B2 | 12/2012 | Nishikawa et al. |
| 2005/0165209 | A1* | 7/2005 | Kurita ..................... B32B 15/08 528/310 |
| 2005/0181268 | A1* | 8/2005 | Ohya ................... H01M 4/8605 429/483 |
| 2009/0143541 | A1* | 6/2009 | Rogl ................... C08G 73/1042 525/432 |
| 2013/0065074 | A1 | 3/2013 | Chiou et al. |

FOREIGN PATENT DOCUMENTS

| CN | 1826288 A | 8/2006 |
| JP | 5-59174 A | 3/1993 |
| JP | 4119693 B2 | 7/2008 |
| JP | 2009-61446 A | 3/2009 |
| TW | 201206696 A1 | 2/2012 |
| TW | 201311767 A1 | 3/2013 |

OTHER PUBLICATIONS

Jain et al., "Tribological Behavior of Unfilled and Filled Poly(Amide-Imide) Copolymer", Wear, 1988, vol. 123, pp. 143-154.
Kyotani et al., "Nanostructural properties of pyrolytic carbon from polyacetylene thin film", Elsevier, Synthetic Metals, 2003, vol. 135-136, pp. 785-786.
Ohnishi et al., "Highly Conductive Graphite Film Prepared From Pyrolysis of Poly(p-Phenylene Vinylene)", Synthetic Metals, 1986, vol. 14, pp. 207-213.
Ohnishi et al., "Preparation and Properties of Highly Conducting Poly(Arylene Vinylenes)", Synthetic Metals, 1991, vol. 41-43, pp. 309-312.
Ohnishi et al., "Preparation of Graphite Film by Pyrolysis of Polymers", Synthetic Metals, 1987, vol. 18, pp. 497-502.
Taiwan Office Action for Appl. No. 102146537 dated Dec. 9, 2014.
Japanese Office Action for Appl. No. 2014-230758 dated Nov. 10, 2015 (w/ English translation).

* cited by examiner

*Primary Examiner* — Richard M Rump
(74) *Attorney, Agent, or Firm* — Birch, Stewart, Kolasch & Birch, LLP

(57) ABSTRACT

A polyamide-imide represented by the following formula

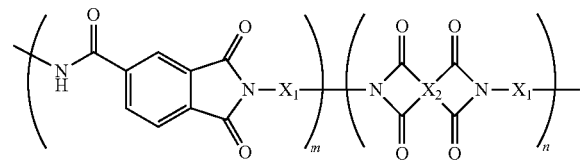

is provided. A graphite film prepared by performing a thermal treatment process on the polyamide-imide represented by the above-mentioned formula is also provided. In the thermal treatment process, the temperature range of the thermal treatment process ranges from 25° C. to 2,900° C.

9 Claims, No Drawings

POLYAMIDE-IMIDES, GRAPHITE FILMS AND PREPARATION FOR THE GRAPHITE FILM

CROSS REFERENCE TO RELATED APPLICATIONS

This Application claims priority of Taiwan Patent Application No. 102146537, filed on Dec. 17, 2013, the entirety of which is incorporated by reference herein.

TECHNICAL FIELD

The technical field relates to a polyamide-imide, and preparation for a graphite film.

BACKGROUND

There is a tendency for the electronics industry to constantly pursue slim electronic products. In addition to demands for heat dissipation in 3C products, the demand for heat dissipation in batteries and other energy-storage devices is also increasing. An artificial graphite film is capable of being adopted in one kind of heat-dissipating part, and being applied to various heating elements due to its relatively high thermal conductivity in a planar direction.

The manufacturing process for artificial graphite film has adopted a specific polymer material, which is treated by a carbonization process of 1,000° C. (under a nitrogen gas environment) and a graphitization process of 2,400° C. (under an argon gas environment), and a subsequent rolling procedure, after which the graphite film is obtained.

With current technology, general polyamide-imide film (PAI film), after a thermal treatment at 2,400° C., is incapable of forming an artificial graphite film due to its low degree of graphitization.

SUMMARY

In accordance with one embodiment of the disclosure, the polyamide-imide is represented by the following formula (I).

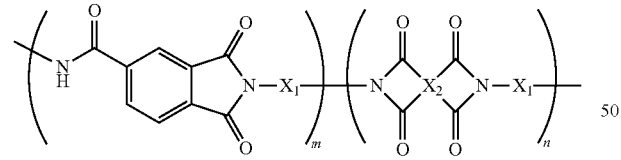

(I)

In formula (I), $X_1$ comprises

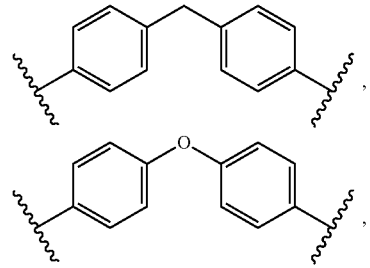

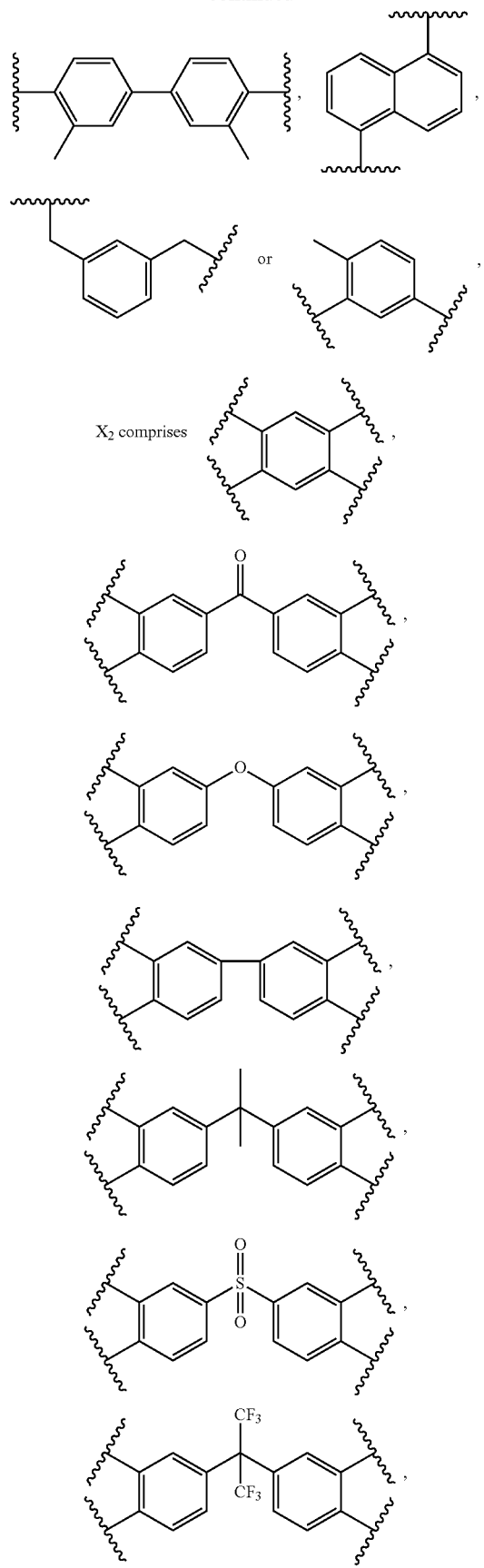

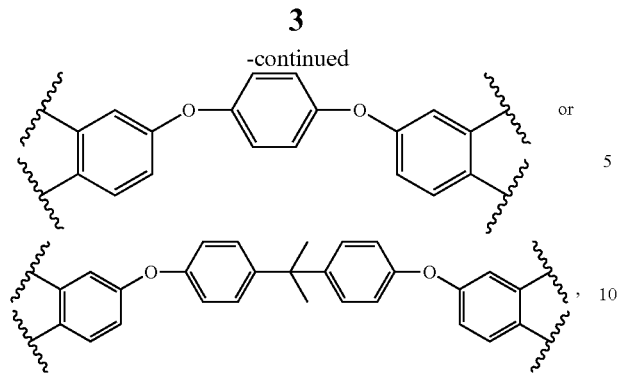

and m:n=8:2-6:4.

In accordance with another embodiment of the disclosure, the disclosure provides a graphite film. The graphite film is prepared by performing a thermal treatment process on a polyamide-imide, wherein the temperature of the thermal treatment process ranges from 25° C. to 2,900° C., and the polyamide-imide is represented by the above-mentioned formula (I).

In accordance with another embodiment of the disclosure, the disclosure provides a method for preparing a graphite film, comprising: performing a thermal treatment process on a polyamide-imide to prepare a graphite film, wherein the temperature of the thermal treatment process ranges from 25° C. to 2,900° C., and the polyamide-imide is represented by the above-mentioned formula (I).

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

In accordance with one embodiment of the disclosure, the disclosure provides a polyamide-imide (PAI) represented by the following formula (I).

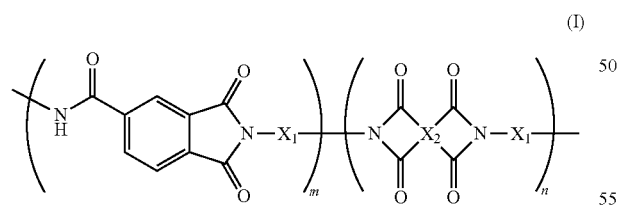

In formula (I), $X_1$ may comprise

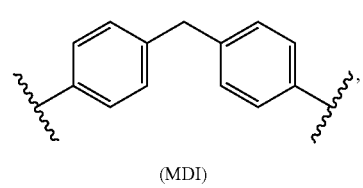

(MDI)

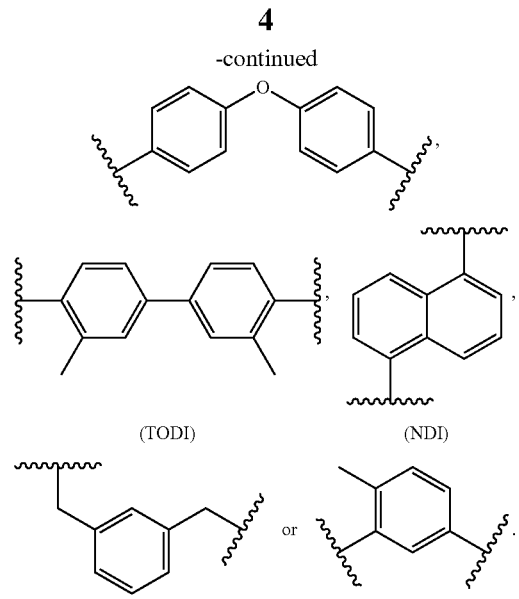

(TODI)   (NDI)

$X_2$ may comprise

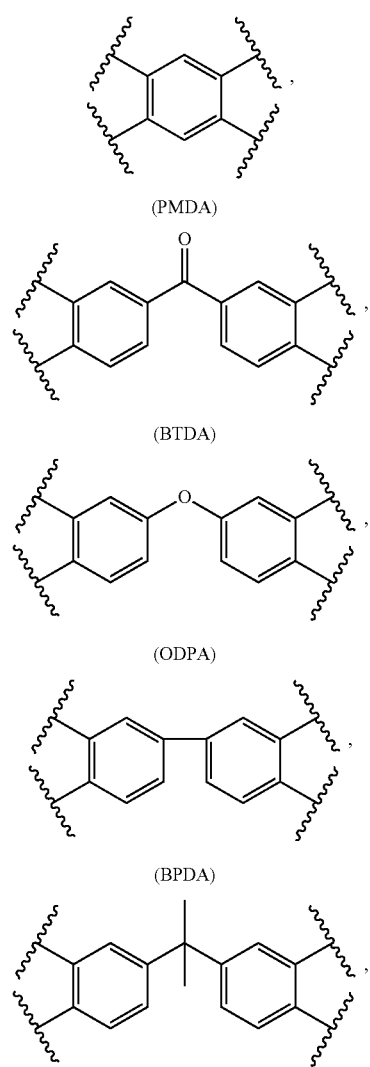

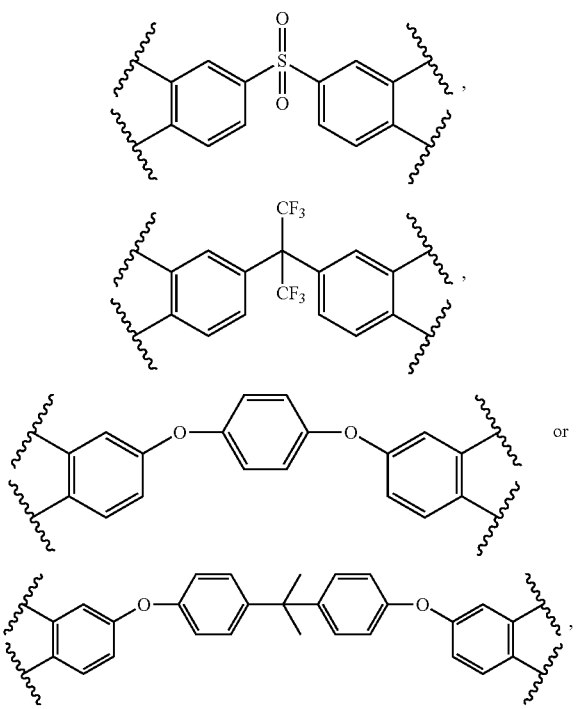

The ratio between m and n in formula (I) may be in a range from 8:2 to 6:4, or from 7.5:2.5 to 6.5:3.5.

In accordance with another embodiment of the disclosure, the disclosure provides a graphite film. The graphite film is prepared by performing a thermal treatment process on a polyamide-imide (PAI). The temperature of the thermal treatment process ranges from about 25° C. to about 2,900° C. The polyamide-imide is represented by the following formula (I).

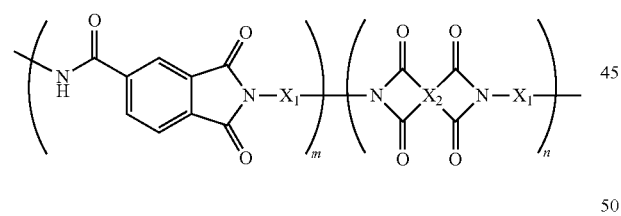

(I)

In formula (I), $X_1$ may comprise

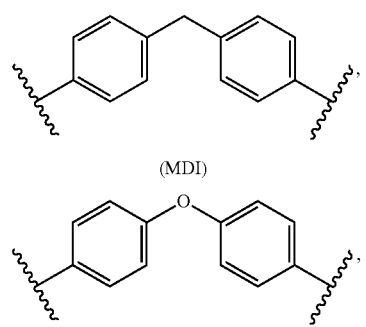

(MDI)

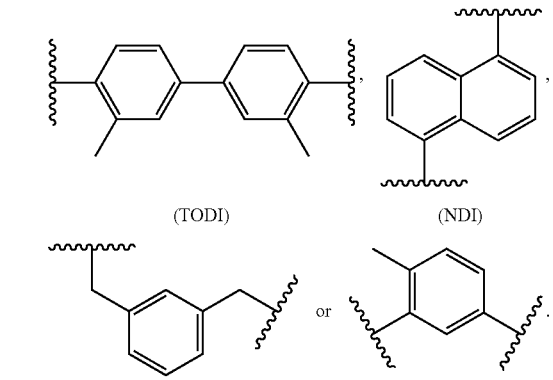

(TODI)  (NDI)

or $X_2$ may comprise

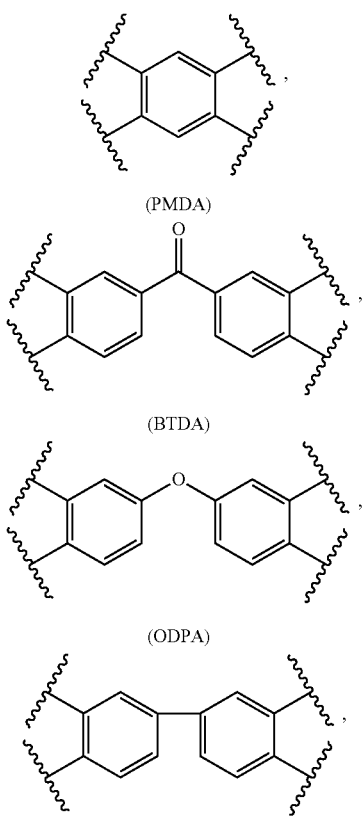

(PMDA)

(BTDA)

(ODPA)

(BPDA)

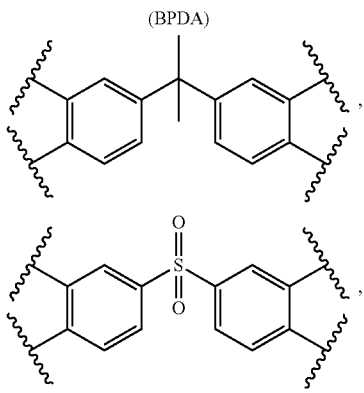

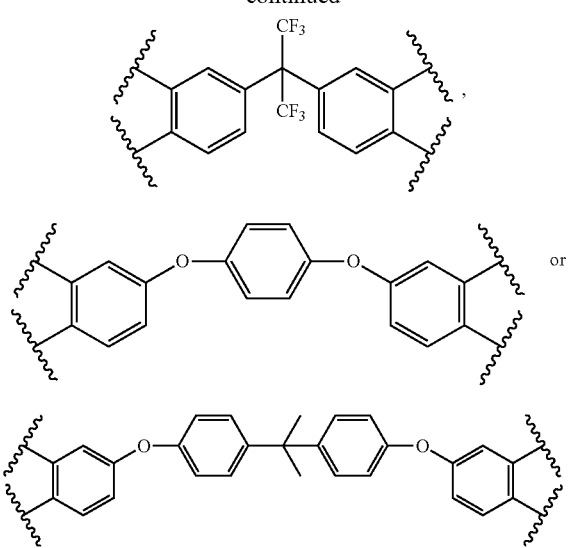
The ratio between m and n in formula (I) may be in a range from 8:2 to 6:4, or from 7.5:2.5 to 6.5:3.5.
In the above-mentioned formula (I) of the polyamide-imide constituting the graphite film, $X_2$ may comprise at least two of
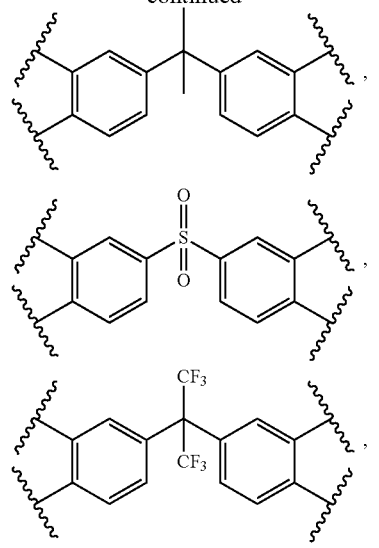
for example, simultaneously selecting
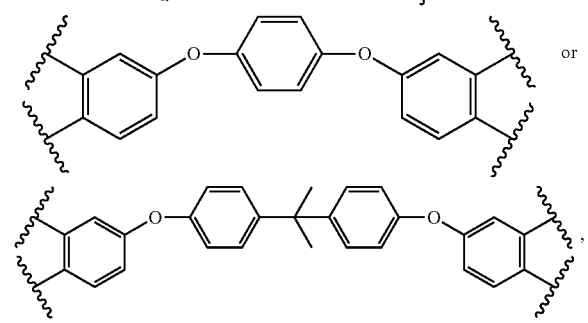
simultaneously selecting
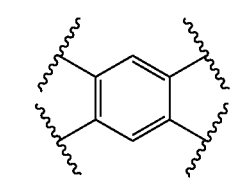

-continued

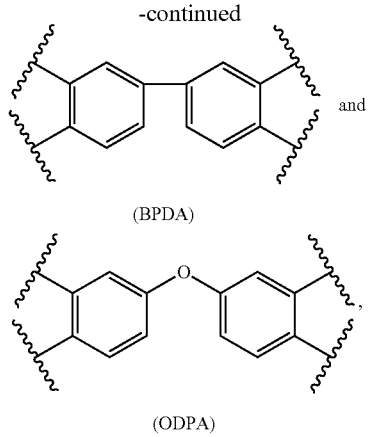

(BPDA)

(ODPA)

or simultaneously selecting

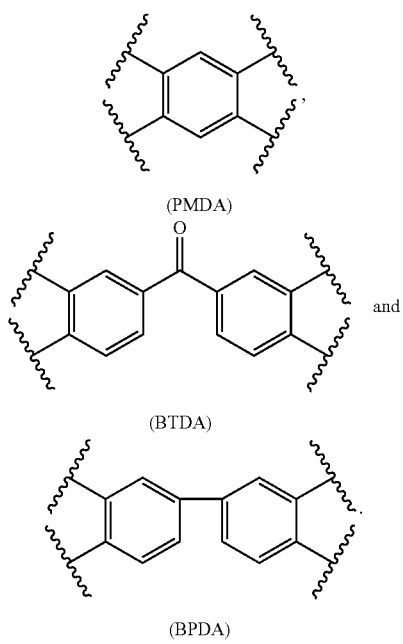

(PMDA)

(BTDA)

(BPDA)

In accordance with another embodiment of the disclosure, the disclosure provides a method for preparing a graphite film comprising performing a thermal treatment process on a polyamide-imide (PAI) to prepare a graphite film.

The temperature of the thermal treatment process ranges from about 25° C. to about 2,900° C.

The polyamide-imide is represented by the following formula (I).

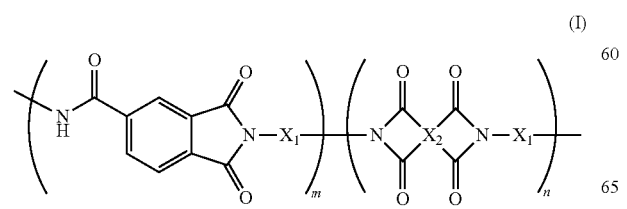

In formula (I), $X_1$ may comprise

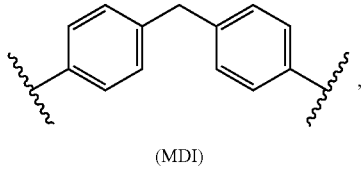

(MDI)

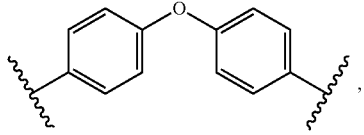

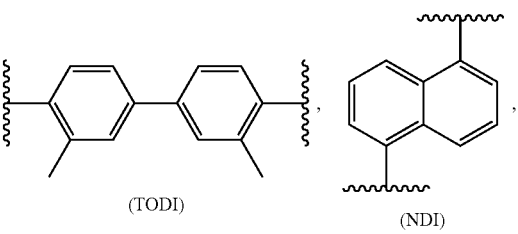

(TODI)        (NDI)

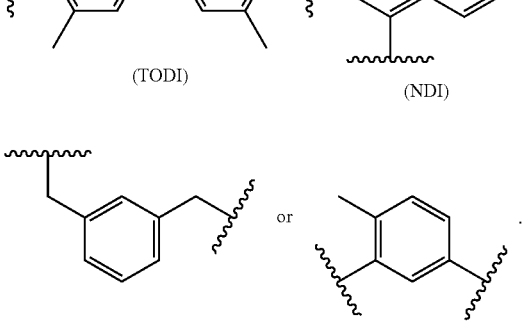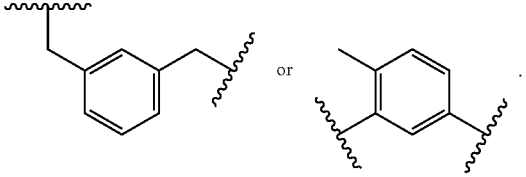

or $X_2$ may comprise

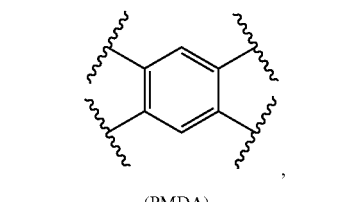

(PMDA)

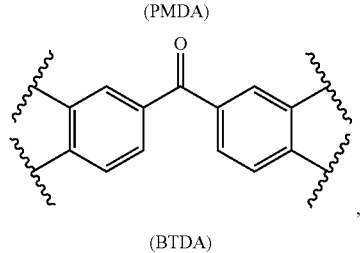

(BTDA)

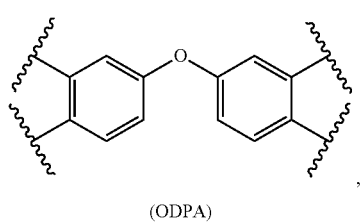

(ODPA)

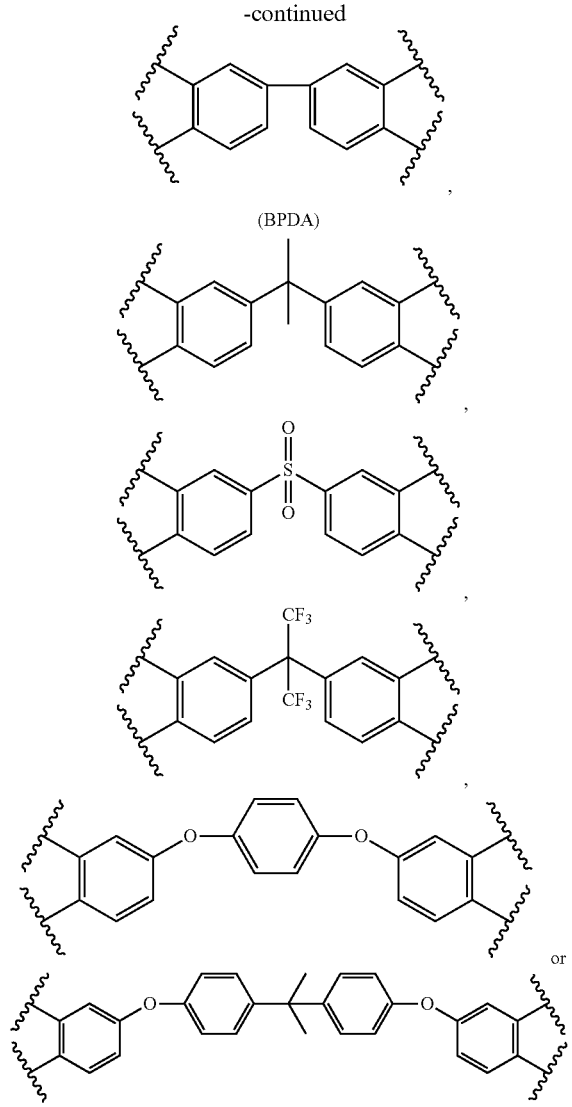

The ratio between m and n in formula (I) may be in a range from 8:2 to 6:4, or from 7.5:2.5 to 6.5:3.5.

The thermal treatment process may comprise a carbonization process and a graphitization process.

The temperature of the carbonization process ranges from about 25° C. to about 1,300° C. The range of the graphitization process temperature is from about 1,800° C. to about 2,900° C.

The present method for preparing a graphite film further comprises utilizing nitrogen gas, hydrogen gas, argon gas or helium gas in the carbonization process, and utilizing argon gas, hydrogen gas or helium gas in the graphitization process.

Compared to traditional PAI, in the disclosure, an appropriate dianhydride in the proper percentage (e.g. if the percentage of dianhydride is too high, it is incapable of forming a polyamide-imide film after coating; if the percentage of dianhydride is too low, then after a thermal treatment above 2,400° C., the degree of graphitization of the polyamide-imide film is low, and it is incapable of forming a graphite film) is conducted into a polyamide-imide. The dianhydride is capable of increasing the molecular weight, film-forming ability and toughness of the polyamide-imide, as well as decreasing the molecular mobility and increasing the molecular arrangement thereof. In addition, the dianhydride is capable of improving the birefringence (e.g. above 0.04) of the polyamide-imide film by an increased orientation and obtaining an artificial graphite film whose degree of graphitization is above 80% after a thermal treatment above 2,400° C.

EXAMPLES

Example 1

Preparation of the graphite film PAI-1 (in polyamide-imide, $X_1$=MDI, $X_2$=PMDA+BPDA)

A 2 L four-port reactor with an agitator and a heating mantle was provided. At room temperature, 153.60 g of trimellitic anhydride (TMA), 24.96 g of pyromellitic dianhydride (PMDA, 67.20 g of 3,3',4,4'-biphenyl tetracarboxylic dianhydride (BPDA, 300.00 g of methylene diphenylene diisocyanate (MDI, and 1637.00 g of NMP solvent were introduced into the reactor and uniformly stirred to form a solution. The solution was heated to 80° C. and allowed to react for one hour. Next, the solution was heated to 120° C. and allowed to react for two hours. Next, the solution was heated to 170° C. and allowed to react for two hours to obtain a resulting solution. The resulting solution was then cooled to room temperature and loaded into a PE bottle. The PE bottle was sealed for preservation.

The solution (the solid content of which was 25.00 wt %) preserved in the PE bottle was taken out and coated on a glass. The solution coated on the glass was dried in a hot-air oven, at 80° C. for one hour, at 150° C. for one hour, at 200° C. for one hour, and at 240° C. for twelve hours, to form a film on the glass. After the film was cooled to room temperature, the glass was soaked in water to remove the film therefrom. The film was then dried at 120° C. for three hours in the hot-air oven. Next, a carbonization process was performed. In the carbonization process, a mixing gas (for example, 5-20% hydrogen gas and 80-95% nitrogen gas, or 5-20% hydrogen gas and 80-95% argon gas and helium gas) was utilized for protecting the film. The treatment temperature of the film was increased from about 25° C. to about 1,300, with a ramping rate less than 10° C./min. The carbonization time of the film reached about fifteen hours above. The applied pressure on the film was increased from about 10 Kgf/cm² to about 15 Kgf/cm². Next, a graphitization process was performed. In the graphitization process, argon gas or helium gas (the purity of which was 6N above) was utilized for protecting the film. The treatment temperature of the film was increased from about 1,800° C. to about 2,800° C., with a ramping rate less than 10° C./min. The graphitization time of the film reached about eight hours above. The applied pressure of the film was increased from about 15 Kgf/cm² to about 25 Kgf/cm². Thereby, the graphite film PAI-1 was obtained. Next, the birefringence and degree of graphitization of the graphite film PAI-1 were measured. The results are shown in Table 1.

Example 2

Preparation of the graphite film PAI-2 (in polyamide-imide, $X_1$=MDI, $X_2$=PMDA+BPDA+ODPA)

A 1 L four-port reactor with an agitator and a heating mantle was provided. At room temperature, 67.74 g of trimellitic anhydride (TMA), 12.81 g of pyromellitic dianhydride (PMDA,

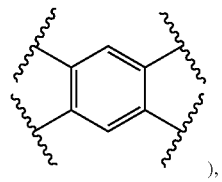 [SMILES: *c1cc(*)c(*)cc1*]

), 17.28 g of 3,3',4,4'-biphenyl tetracarboxylic dianhydride (BPDA,

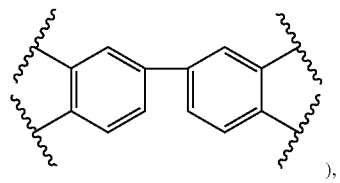 [SMILES: *c1ccc(-c2ccc(*)c(*)c2)cc1*]

), 36.45 g of 4,4'-oxydiphthalic anhydride (ODPA,

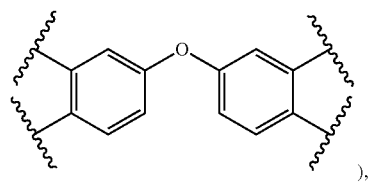 [SMILES: *c1ccc(Oc2ccc(*)c(*)c2)cc1*]

), 150.00 g of methylene diphenylene diisocyanate (MDI,

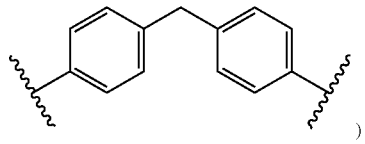 [SMILES: *c1ccc(Cc2ccc(*)cc2)cc1]

)

and 852.00 g of NMP solvent were introduced into the reactor and uniformly stirred to form a solution. The solution was heated to 80° C. and allowed to react for one hour. Next, the solution was heated to 120° C. and allowed to react for two hours. Next, the solution was heated to 170° C. and allowed to react for two hours to obtain a resulting solution. The resulting solution was then cooled to room temperature and loaded into a PE bottle. The PE bottle was sealed for preservation.

The solution (the solid content of which was 25.00 wt %) preserved in the PE bottle was taken out and coated on a glass. The solution coated on the glass was dried in a hot-air oven, at 80° C. for one hour, at 150° C. for one hour, at 200° C. for one hour, and at 240° C. for twelve hours, to form a film on the glass. After the film was cooled to room temperature, the glass was soaked in water to remove the film therefrom. The film was then dried at 120° C. for three hours in the hot-air oven. Next, a carbonization process was performed. In the carbonization process, a mixing gas (for example, 5-20% hydrogen gas and 80-95% nitrogen gas, or 5-20% hydrogen gas and 80-95% argon gas and helium gas) was utilized for protecting the film. The treatment temperature of the film was increased from about 25° C. to about 1,300, with a ramping rate less than 10° C./min. The carbonization time of the film reached about fifteen hours above. The applied pressure on the film was increased from about 10 Kgf/cm² to about 15 Kgf/cm². Next, a graphitization process was performed. In the graphitization process, argon gas or helium gas (the purity of which was 6N above) was utilized for protecting the film. The treatment temperature of the film was increased from about 1,800° C. to about 2,800° C., with a ramping rate less than 10° C./min. The graphitization time of the film reached about eight hours above. The applied pressure on the film was increased from about 15 Kgf/cm² to about 25 Kgf/cm². Thereby, the graphite film PAI-2 was obtained. Next, the birefringence and degree of graphitization of the graphite film PAI-2 were measured. The results are shown in Table 1.

Example 3

Preparation of the graphite film PAI-3 (in polyamide-imide, $X_1$=MDI, $X_2$=PMDA+BTDA+BPDA)

A 500 mL four-port reactor with an agitator and a heating mantle was provided. At room temperature, 22.58 g of trimellitic anhydride (TMA), 4.28 g of pyromellitic dianhydride (PMDA,

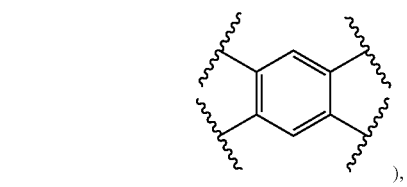 [SMILES: *c1cc(*)c(*)cc1*]

), 11.53 g of 3,3',4,4'-biphenyl tetracarboxylic dianhydride (BPDA,

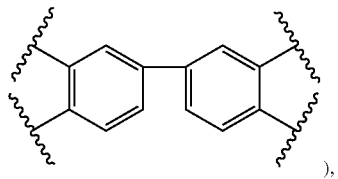 [SMILES: *c1ccc(-c2ccc(*)c(*)c2)cc1*]

), 6.31 g of 3,3',4,4'-benzophenone tetracarboxylic dianhydride (BTDA,

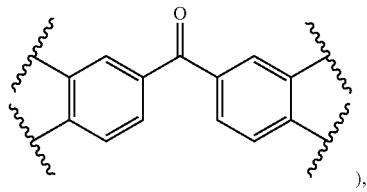 [SMILES: *c1ccc(C(=O)c2ccc(*)c(*)c2)cc1*]

), 50.00 g of methylene diphenylene diisocyanate (MDI,

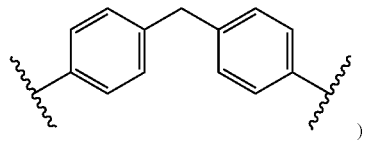

)

and 284.00 g of NMP solvent were introduced into the reactor and uniformly stirred to form a solution. The solution was heated to 80° C. and allowed to react for one hour. Next, the solution was heated to 120° C. and allowed to react for two hours. Next, the solution was heated to 170° C. and allowed to react for two hours to obtain a resulting solution. The resulting solution was then cooled to room temperature and loaded into a PE bottle. The PE bottle was sealed for preservation.

The solution (the solid content of which was 25.00 wt %) preserved in the PE bottle was taken out and coated on a glass. The solution coated on the glass was dried in a hot-air oven, at 80° C. for one hour, at 150° C. for one hour, at 200° C. for one hour, and at 240° C. for twelve hours, to form a film on the glass. After the film was cooled to room temperature, the glass was soaked in water to remove the film therefrom. The film was then dried at 120° C. for three hours in the hot-air oven. Next, a carbonization process was performed. In the carbonization process, a mixing gas (for example, 5-20% hydrogen gas and 80-95% nitrogen gas, or 5-20% hydrogen gas and 80-95% argon gas and helium gas) was utilized for protecting the film. The treatment temperature of the film was increased from about 25° C. to about 1,300, with a ramping rate less than 10° C./min. The carbonization time of the film reached about fifteen hours above. The applied pressure on the film was increased from about 10 Kgf/cm² to about 15 Kgf/cm². Next, a graphitization process was performed. In the graphitization process, argon gas or helium gas (the purity of which was 6N above) was utilized for protecting the film. The treatment temperature of the film was increased from about 1,800° C. to about 2,800° C., with a ramping rate less than 10° C./min. The graphitization time of the film reached about eight hours above. The applied pressure on the film was increased from about 15 Kgf/cm² to about 25 Kgf/cm². Thereby, the graphite film PAI-3 was obtained. Next, the birefringence and degree of graphitization of the graphite film PAI-3 were measured. The results are shown in Table 1.

Example 4

Preparation of the graphite film PAI-4 (in polyamide-imide, $X_1$=TODI, $X_2$=PMDA+BPDA)

A 2 L four-port reactor with an agitator and a heating mantle was provided. At room temperature, 153.60 g of trimellitic anhydride (TMA), 24.96 g of pyromellitic dianhydride (PMDA,

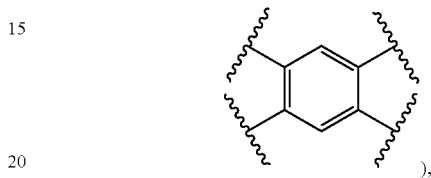

), 67.20 g of 3,3',4,4'-biphenyl tetracarboxylic dianhydride (BPDA,

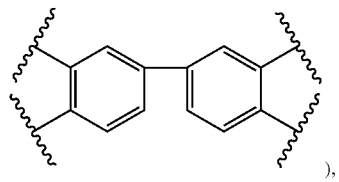

), 316.82 g of 3,3'-dimethyl-4,4'-biphenylene diisocyanate (TODI,

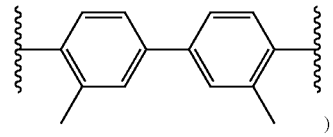 [SMILES: *c1ccc(-c2ccc(*)c(C)c2)cc1C]

)

and 1687.74 g of NMP solvent were introduced into the reactor and uniformly stirred to form a solution. The solution was heated to 80° C. and allowed to react for one hour. Next, the solution was heated to 120° C. and allowed to react for two hours. Next, the solution was heated to 170° C. and allowed to react for two hours to obtain a resulting solution. The resulting solution was then cooled to room temperature and loaded into a PE bottle. The PE bottle was sealed for preservation.

The solution (the solid content of which was 25.00 wt %) preserved in the PE bottle was taken out and coated on a glass. The solution coated on the glass was dried in a hot-air oven, at 80° C. for one hour, at 150° C. for one hour, at 200° C. for one hour, and at 240° C. for twelve hours, to form a film on the glass. After the film was cooled to room temperature, the glass was soaked in water to remove the film therefrom. The film was then dried at 120° C. for three hours in the hot-air oven. Next, a carbonization process was performed. In the carbonization process, a mixing gas (for example, 5-20% hydrogen gas and 80-95% nitrogen gas, or 5-20% hydrogen gas and 80-95% argon gas and helium gas) was utilized for protecting the film. The treatment temperature of the film was increased from about 25° C. to about 1,300, with a ramping rate less than 10° C./min. The carbonization time of the film reached about fifteen hours above. The applied pressure on the film was increased from about 10 Kgf/cm² to about 15 Kgf/cm². Next, a graphitization process was performed. In the graphitization process, argon gas or helium gas (the purity of which was 6N above) was utilized for protecting the film. The treatment temperature of the film was increased from about 1,800° C. to about 2,800° C., with a ramping rate less than 10° C./min. The graphitization time of the film reached about eight hours above. The applied pressure on the film was increased from about 15 Kgf/cm² to about 25 Kgf/cm². Thereby, the graphite film PAI-4 was obtained. Next, the birefringence and degree of graphitization of the graphite film PAI-4 were measured. The results are shown in Table 1.

Example 5

Preparation of the graphite film PAI-5 (in polyamide-imide, $X_1$=NDI, $X_2$=PMDA+BPDA)

A 2 L four-port reactor with an agitator and a heating mantle was provided. At room temperature, 153.60 g of trimellitic anhydride (TMA), 24.96 g of pyromellitic dianhydride (PMDA,

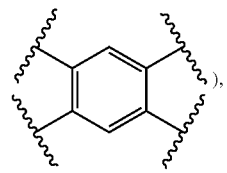 [SMILES: *c1cc(*)c(*)cc1*]

), 67.20 g of 3,3',4,4'-biphenyl tetracarboxylic dianhydride (BPDA,

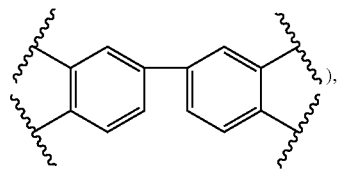 [SMILES: *c1ccc(-c2ccc(*)c(*)c2)cc1*]

), 251.96 g of 1,5-naphthalene diisocyanate (NDI,

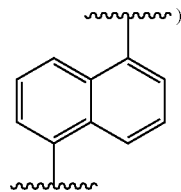

)

and 1493.16 g of NMP solvent were introduced into the reactor and uniformly stirred to form a solution. The solution was heated to 80° C. and allowed to react for one hour. Next, the solution was heated to 120° C. and allowed to react for two hours. Next, the solution was heated to 170° C. and allowed to react for two hours to obtain a resulting solution. The resulting solution was then cooled to room temperature and loaded into a PE bottle. The PE bottle was sealed for preservation.

The solution (the solid content of which was 25.00 wt %) preserved in the PE bottle was taken out and coated on a glass. The solution coated on the glass was dried in a hot-air oven, at 80° C. for one hour, at 150° C. for one hour, at 200° C. for one hour, and at 240° C. for twelve hours, to form a film on the glass. After the film was cooled to room temperature, the glass was soaked in water to remove the film therefrom. The film was then dried at 120° C. for three hours in the hot-air oven. Next, a carbonization process was performed. In the carbonization process, a mixing gas (for example, 5-20% hydrogen gas and 80-95% nitrogen gas, or 5-20% hydrogen gas and 80-95% argon gas and helium gas) was utilized for protecting the film. The treatment temperature of the film was increased from about 25° C. to about 1,300, with a ramping rate less than 10° C./min. The carbonization time of the film reached about fifteen hours above. The applied pressure on the film was increased from about 10 Kgf/cm² to about 15 Kgf/cm². Next, a graphitization process was performed. In the graphitization process, argon gas or helium gas (the purity thereof was 6N above) was utilized for protecting the film. The treatment temperature of the film was increased from about 1,800° C. to about 2,800° C., with a ramping rate less than 10° C./min. The graphitization time of the film reached about eight hours above. The applied pressure of the film was increased from about 15 Kgf/cm² to about 25 Kgf/cm². Thereby, the graphite film PAI-5 was obtained. Next, the birefringence and degree of graphitization of the graphite film PAI-5 were measured. The results are shown in Table 1.

Comparative Example 1

Preparation of Conventional Graphite Film PAI-6 (Polyamide-Imide

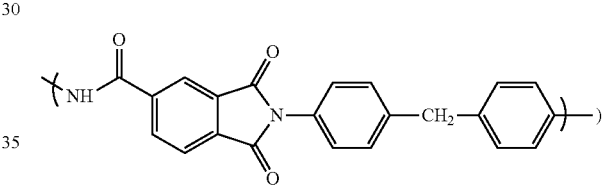

A 500 mL four-port reactor with an agitator and a heating mantle was provided. At room temperature, 37.68 g of trimellitic anhydride (TMA), 50.00 g of methylene diphenylene diisocyanate (MDI,

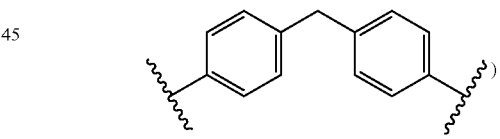

)

and 263.04 g of NMP solvent were introduced into the reactor and uniformly stirred to form a solution. The solution was heated to 80° C. and allowed to react for one hour. Next, the solution was heated to 120° C. and allowed to react for two hours. Next, the solution was heated to 170° C. and allowed to react for two hours to obtain a resulting solution. The resulting solution was then cooled to room temperature and loaded into a PE bottle. The PE bottle was sealed for preservation.

The solution (the solid content of which was 25.00 wt %) preserved in the PE bottle was taken out and coated on a glass. The solution coated on the glass was dried in a hot-air oven, at 80° C. for one hour, at 150° C. for one hour, at 200° C. for one hour, and at 240° C. for twelve hours, to form a film on the glass. After the film was cooled to room temperature, the glass was soaked in water to remove the film therefrom. The film was then dried at 120° C. for three hours in the hot-air oven. Next, a carbonization process was performed. In the carbonization process, a mixing gas (for example, 5-20% hydrogen gas and 80-95% nitrogen gas, or 5-20% hydrogen gas and 80-95% argon gas and helium gas) was utilized for protecting the film. The treatment temperature of the film was increased from about 25° C. to about 1,300, with a ramping rate less than 10° C./min. The carbonization time of the film reached about fifteen hours above. The applied pressure on the film was increased from about 10 Kgf/cm² to about 15 Kgf/cm². Next, a graphitization process was performed. In the graphitization process, argon gas or helium gas (the purity thereof was 6N above) was utilized for protecting the film. The treatment temperature of the film was increased from about 1,800° C. to about 2,800° C., with a ramping rate less than 10° C./min. The graphitization time of the film reached about eight hours above. The applied pressure on the film was increased from about 15 Kgf/cm² to about 25 Kgf/cm². Thereby, the graphite film PAI-6 was obtained. Next, the birefringence and degree of graphitization of the graphite film PAI-6 were measured. The results are shown in Table 1.

TABLE 1

|  | Example 1 (PAI-1) | Example 2 (PAI-2) | Example 3 (PAI-3) | Example 4 (PAI-4) | Example 5 (PAI-5) | Com. Example 1 (PAI-6) |
|---|---|---|---|---|---|---|
| Trimellitic anhydride (TMA) | TMA | TMA | TMA | TMA | TMA | TMA |
| Diisocyanate (DI) | MDI | MDI | MDI | TODI | NDI | MDI |
| Dianhydride (DA) | PMDA BPDA | PMDA BPDA ODPA | PMDA BTDA BPDA | PMDA BPDA | PMDA BPDA | — |
| m:n (molar ratio) | 7:3 | 6:4 | 6:4 | 8:2 | 8:2 | — |
| Birefringence | 0.041 | 0.045 | 0.046 | 0.05 | 0.056 | 0.0026 |
| Degree of graphitization (%) | 85 | 85 | 88 | 90 | 91 | 25 |

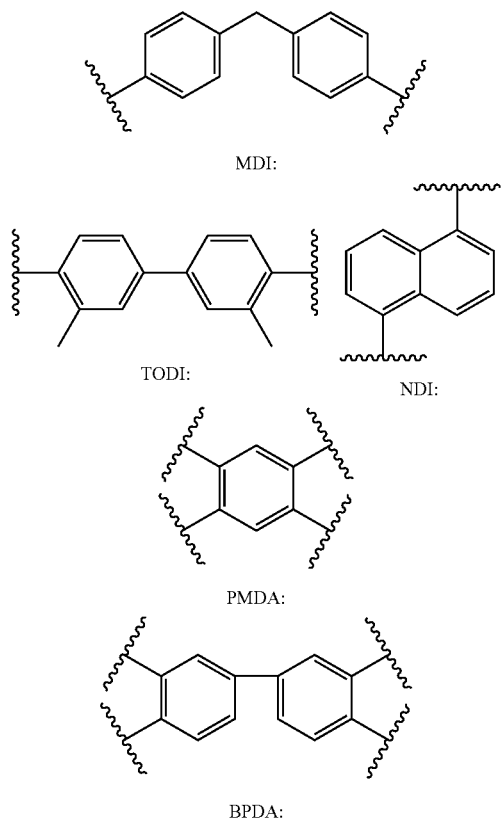

MDI:

TODI:

NDI:

PMDA:

BPDA:

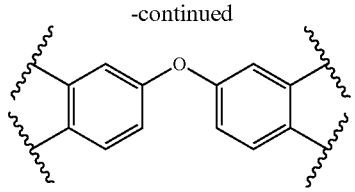

-continued

ODPA:

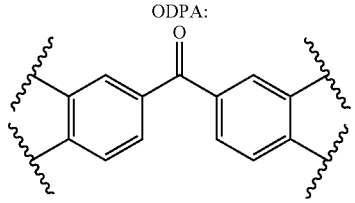

BTDA:

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:

1. A polyamide-imide, represented by the following formula (I):

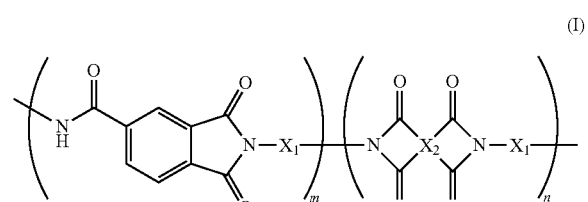

wherein,
m:n=8:2-6:4; and $X_1$ and $X_2$ are defined as one of (1), (2) or (3) as follows:
(1) $X_1$ is

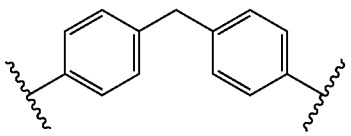

and X₂ is a combination of

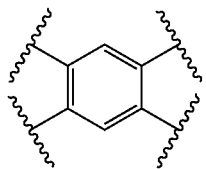 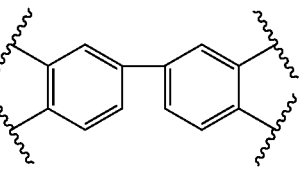
and , a combination of

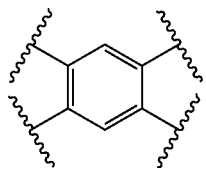 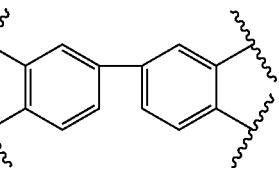
, and

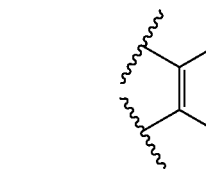

or a combination of

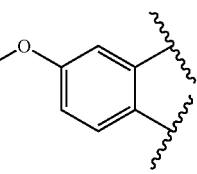
,

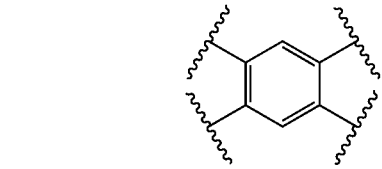
and

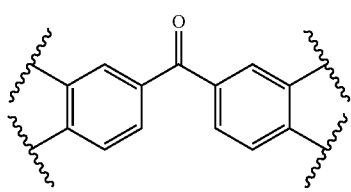
, (2) X₁ is

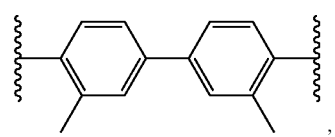
, and X₂ is a combination of

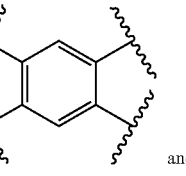 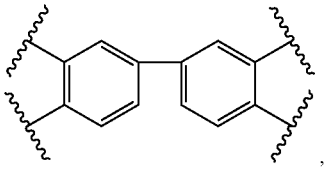
and , or
(3) X₁ is

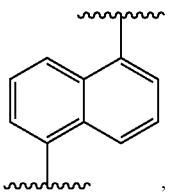 [SMILES: *c1cccc2c(*)cccc12]
, and X₂ is a combination of

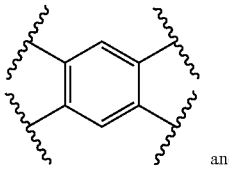 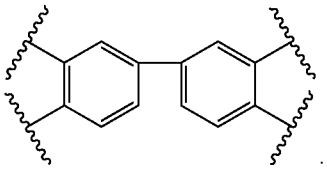
and .

2. The polyamide-imide as claimed in claim 1, wherein m:n=7.5:2.5-6.5:3.5.

3. A graphite film comprising a polyamide-imide, represented by the following formula (I), prepared by performing a thermal treatment process on the polyamide-imide, wherein the temperature range of the thermal treatment process ranges from 25° C. to 2,900° C.:

(I)

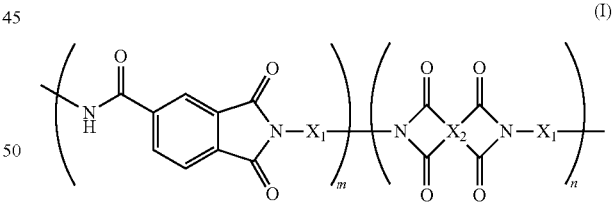

wherein,
m:n=8:2-6:4; and X₁ and X₂ are defined as one of (1), (2) or (3) as follows:
(1) X₁ is

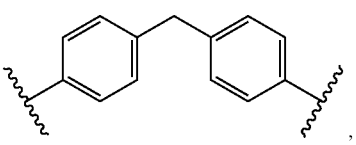 [SMILES: *c1ccc(Cc2ccc(*)cc2)cc1]
, and $X_2$ is a combination of

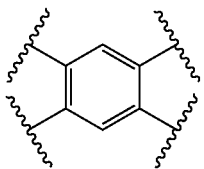 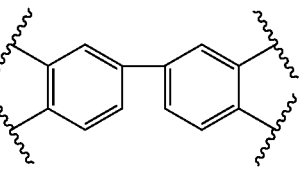

and , a combination of

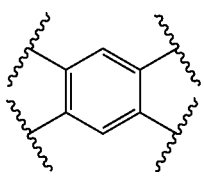 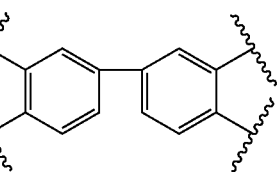

,

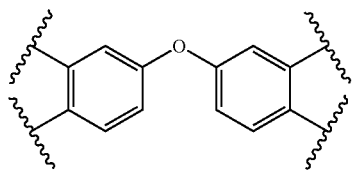

or a combination of

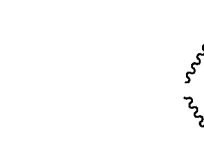

,

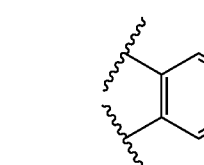

and

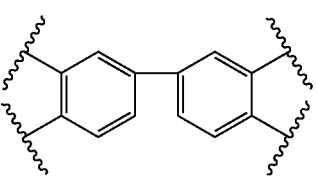

, (2) $X_1$ is

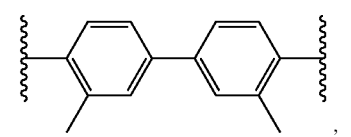

, and $X_2$ is a combination of

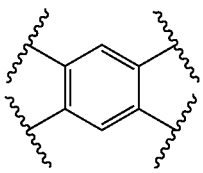 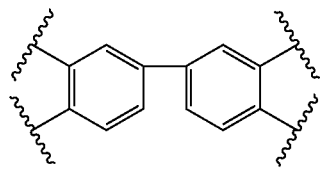

and , or
(3) $X_1$ is

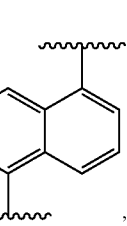

, and $X_2$ is a combination of

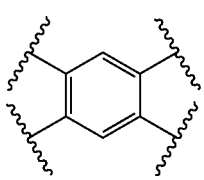 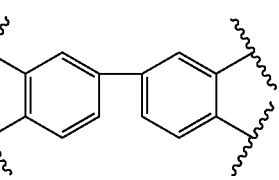

and .

4. A method for preparing a graphite film, comprising:
performing a thermal treatment process on a polyamide-imide film to turn into a graphite film, wherein the range of the thermal treatment process temperature is from 25° C. to 2,900° C., and the polyamide-imide is represented by the following formula (I):

(I)

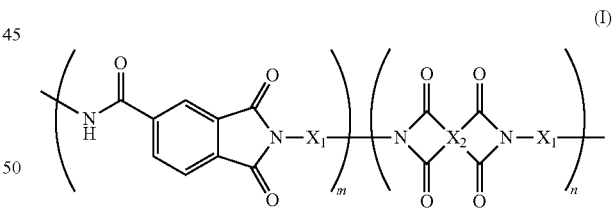

wherein,
m:n=8:2-6:4; and $X_1$ and $X_2$ are defined as one of (1), (2) or (3) as follows:
(1) $X_1$ is

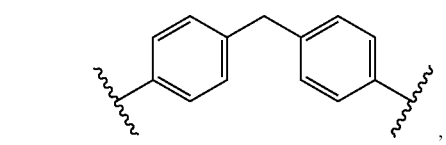 [SMILES: *c1ccc(Cc2ccc(*)cc2)cc1]

, and X₂ is a combination of

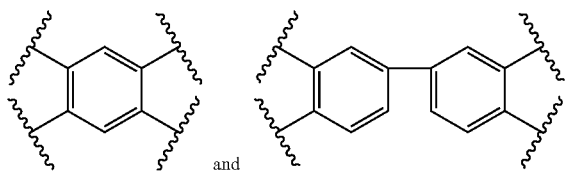

and a combination of

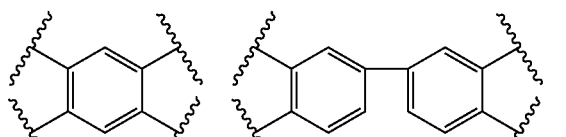

,   and

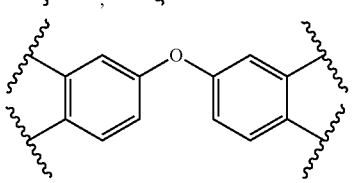

, or a combination of

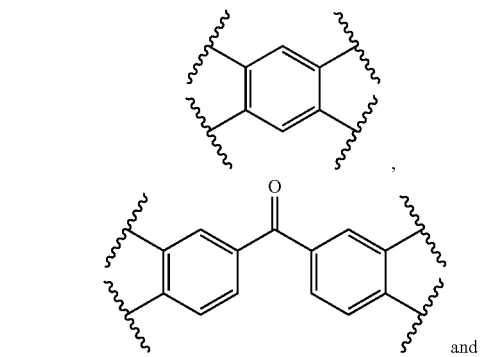

and

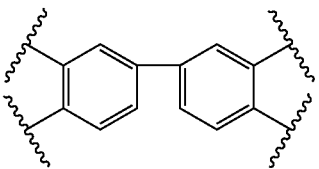

, (2) X₁ is

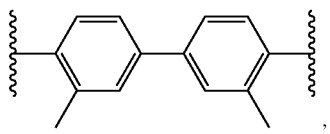

,

X₂ is a combination of

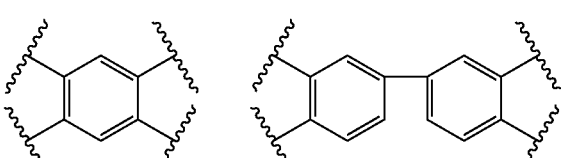

and

, or (3) X₁ is

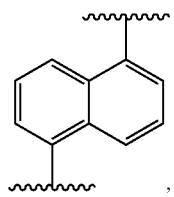 [SMILES: *c1cccc2c(*)cccc12]

, and X₂ is a combination of

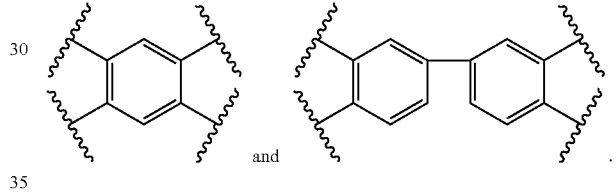

and

.

5. The method for preparing a graphite film as claimed in claim 4, wherein the thermal treatment process comprises a carbonization process and a graphitization process.

6. The method for preparing a graphite film as claimed in claim 5, wherein the temperature of the carbonization process ranges from 25° C. to 1,300° C.

7. The method for preparing a graphite film as claimed in claim 5, wherein the temperature of the graphitization process ranges from 1,800° C. to 2,900° C.

8. The method for preparing a graphite film as claimed in claim 5, further comprising utilizing nitrogen gas, hydrogen gas, argon gas or helium gas in the carbonization process.

9. The method for preparing a graphite film as claimed in claim 5, further comprising utilizing argon gas, hydrogen gas or helium gas in the graphitization process.

\* \* \* \* \*